Patented Apr. 27, 1954

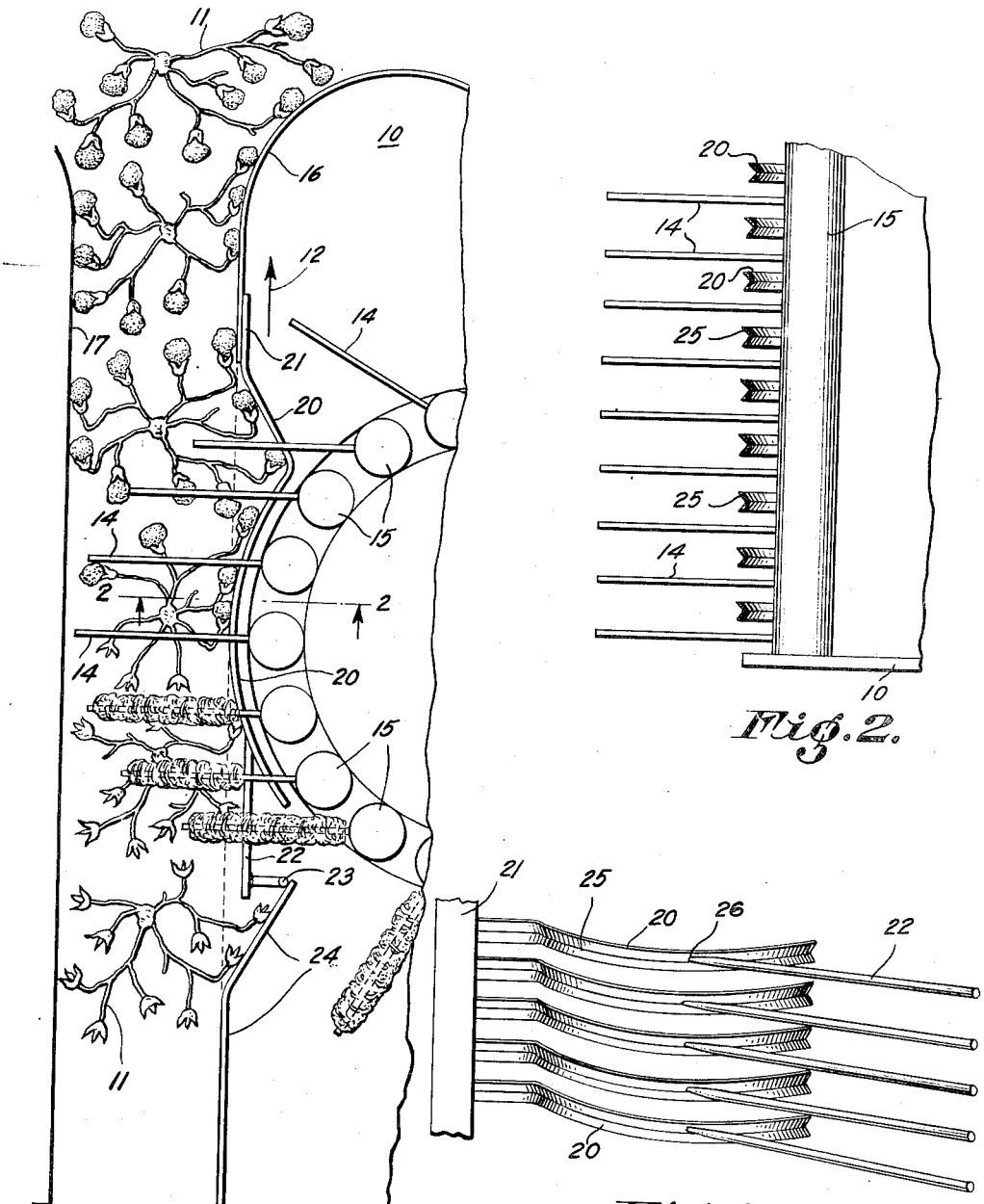

2,676,449

UNITED STATES PATENT OFFICE 2,676,449

GRID CONSTRUCTION FOR COTTON PICKERS

William Burris Smith, Greenville, Miss., assignor of one-half to Hugh A. Gamble, Greenville, Miss.

Application April 17, 1951, Serial No. 221,461

4 Claims. (Cl. 56—41)

This invention relates to rotating spindle type cotton pickers and more particularly to an improved grid construction for guiding and controlling the movement of the limbs of cotton plants passing between the rotating picking spindles.

The rotating spindle type cotton picker as shown, for example, in Patent 1,747,566 issued to Hiram N. Berry, February 18, 1930, comprises a plurality of rotary picking spindles supported in vertical rows of horizontally projecting spindles. As the picker is moved along the side of a row of cotton plants, the vertical rows of spindles are successively projected into the cotton plants to wind off cotton fibers onto the spindles which are then withdrawn from the plants. The limbs and branches of the cotton plants enter the space between the picking spindles and sometimes become entangled with the spindle supporting structure or damage some of the picking spindles. It has been customary to provide such cotton pickers with an arrangement of horizontal bars forming a slotted grid through which the spindles project outward and which limits the penetration of trash and limbs of cotton plants into the spaces between the spindle supports.

It is an object of this invention to provide an improved grid construction which limits the penetration of the limbs of cotton plants into the spaces between cotton picking spindles.

It is another object of this invention to provide an improved grid construction which engages the ends of the limbs of cotton plants for guiding said limbs past projecting picking spindles.

It is another object of this invention to provide an improved grid construction including members having portions of channel-shape cross section to limit actual engagement of cotton plant limbs with rotary cotton picking spindles.

It is still another object of this invention to provide an improved grid construction which is economical to manufacture and apply, and which is durable and effective over extended periods of continual usage.

Other objects and advantages of this invention will be readily apparent to those skilled in the art from examination of the following description of a preferred embodiment illustrated in the accompanying drawings wherein:

Figure 1 is a plan view of a portion of a cotton picker adjacent to a row of cotton plants and illustrating the location of the improved grid construction.

Figure 2 is a fragmentary vertical sectional view taken on line 2—2 of Figure 1 but omitting the cotton plants.

Figure 3 is a perspective view of the grid construction removed from a cotton picker.

Referring to the drawings for purposes of illustration, a portion of a cotton picker is designated generally by the numeral 10. The picker 10 is moved along the side of a row of cotton plants 11 in the direction of arrow 12. As the picker 10 moves forward, vertical rows of cotton picking spindles 14 are successively penetrated into the sides of and through the plants 11. Mechanisms 15 for supporting the spindles 14, for rotating the spindles when they are in the plants, and for moving the vertical rows of spindles rearward as the picker moves forward are well known in the art, and form no part of the present invention.

The forward portion of the cotton picker 10 has a curved side plate 16 which the ends of the limbs and branches of the cotton plants 11 engage as the picker progresses along the row. The plate 16 serves to compress the cotton plants as they approach the vertical rows of picking spindles 14. A guide plate 17, a portion of such a plate being illustrated in Figure 1, may be provided on the picker on the opposite side of the cotton plants 11 to aid in compressing the plants. Where the cotton plants reach the area in which the vertical rows of spindles 14 are projeced outwards of the cotton picker, the compressed plants expand somewhat so that the spindles may penetrate between the branches and limbs of the plants. The longer branches and limbs of the plants tend to extend into the picking machine between the picking spindles 14. To limit or avoid contact of the ends of the branches with the spindle support mechanisms 15, the grid construction hereinafter described is utilized.

The grid comprises a series of horizontal bars 20 parallel to one another and spaced to extend between the picking spindles while the spindles are in the cotton plants. The several bars 20 may be supported at their forward end by the vertical plate 21 which is secured to the rearward edge of compressor plate 16. The bars 20 are preferably curved, as shown in Figure 1, to extend close to the spindle support mechanisms 15 where the spindles project into cotton plants 11. The rearward portion of each bar 20 may be provided with an extension 22. The extension 22 may be secured to the bar 20 as by welding 26, and may have a lateral portion secured to a vertical post or channel 23 for support. A side plate 24 carried by the picker 10 extends rearward from the ends of the grid bar extensions 22.

The grid bars 20 are formed with a channel or V-shape cross-section, as shown in Figure 2. The channel 25 formed by the V-shape faces outwardly and toward the sides of the cotton plants 11. The channel 25 engages the ends of the limbs and branches of the cotton plants and serves to guide the limbs between the picking spindles 14. The channel 25 is effective to prevent the ends of limbs from being broken or cut by engagement with the rotary spindles, and is effective to prevent the compressed limbs and branches from slipping off the grid bars into the space between the grid bars and adjacent spindles, and keeps the ends of the branches out of contact with the spindle support and drive mechanisms 15. While the grid bars 20 are illustrated as having a V-shape cross section, it will be readily apparent to those skilled in the art that grooves or channels of U-shape or semi-circular shape or any concave outward shape are equivalent and effective.

I claim:

1. In a cotton picker movable along a row of cotton plants and having rows of rotatable picking spindles movable into and out of said plants, a grid construction for guiding the movement of cotton plant limbs and branches between said spindles, said grid construction comprising a plurality of spaced bars supported by said picker and extending between said picking spindles, each of said bars being of channel-shape cross section and having a channel surface facing toward the outer ends of said picking spindles for engagement by said limbs and branches to guide the same during passage between said spindles.

2. In a cotton picker movable along a row of cotton plants and having rows of rotatable picking spindles movable into and out of said plants, a grid construction for guiding the movement of cotton plant limbs and branches between said spindles, said grid construction comprising a plurality of spaced parallel bars supported by said picker and extending between said picking spindles, each of said parallel bars being of V-shaped cross section with the grooved surface of said bars facing toward the outer ends of said picking spindles, said grooved surface to be engaged by and to limit the penetration of said limbs and branches between said picking spindles.

3. In a cotton picker movable along a row of cotton plants and having vertical rows of rotatable picking spindles projecting from the picker into said cotton plants, a grid construction for guiding the movement of cotton plant limbs and branches between said projecting spindles, said grid construction being supported by said picker and comprising a plurality of horizontally extending spaced bars extending between the spindles of a vertical row of spindles, each of said bars having a portion of its length between said picking spindles shaped with a channel surface facing toward the outer ends of said picking spindles for engagement by said limbs and branches to guide the same during their passage between said spindles.

4. In a cotton picker movable along a row of cotton plants and having vertical rows of rotatable picking spindles supported for movement in a cylindrical path to project successive rows of spindles into said plants, a grid construction for guiding the movement of cotton plant limbs and branches between the projecting spindles, said grid construction comprising a plurality of horizontally extending spaced bars supported by said picker and extending between said projecting spindles, each of said bars having a portion of its length curved providing an arcuate portion spaced from said spindle support, and each of said bars having a channel surface on said arcuate portion and facing toward the outer ends of said picking spindles for engagement with said limbs and branches to limit the penetration of said limbs and branches between said spindles.

References Cited in the file of this patent

UNITED STATES PATENTS

| Number | Name | Date |
| --- | --- | --- |
| 768,400 | Piper | Aug. 23, 1904 |
| 1,500,992 | Irwin | July 8, 1924 |
| 1,802,022 | Johnston et al. | Apr. 21, 1931 |
| 1,901,686 | Wirth | Mar. 14, 1933 |
| 2,082,053 | Freudenberg | June 1, 1937 |